US009551630B2

(12) United States Patent
Bertin et al.

(10) Patent No.: US 9,551,630 B2
(45) Date of Patent: Jan. 24, 2017

(54) DEVICE FOR FIXING REACTOR MODULES TO A TEST BENCH

(71) Applicant: SNECMA, Paris (FR)

(72) Inventors: Michael Bertin, Vileneuve la Guyard (FR); Jean-Michel Boudin, Champagne sur Seine (FR); Aurelien Caplain, Fontenay Sous Bois (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/670,744

(22) Filed: Mar. 27, 2015

(65) Prior Publication Data

US 2015/0285709 A1   Oct. 8, 2015

(30) Foreign Application Priority Data

Apr. 4, 2014   (FR) ..................................... 14 53025

(51) Int. Cl.
*A47F 5/00* (2006.01)
*G01M 15/02* (2006.01)
*F01D 25/28* (2006.01)

(52) U.S. Cl.
CPC ............ *G01M 15/02* (2013.01); *F01D 25/285* (2013.01); *Y02T 50/671* (2013.01)

(58) Field of Classification Search
CPC ...... F01D 25/285; G01M 15/02; Y02T 50/671
USPC ... 248/309.1, 638, 674, 677, 678; 73/116.03
See application file for complete search history.

(56) References Cited

U.S. PATENT DOCUMENTS

| 3,038,331 | A | * | 6/1962 | Henry | ................... F01D 25/285 267/160 |
| 5,396,791 | A | * | 3/1995 | Mollmann | ............ B64F 5/0045 248/554 |
| 2001/0029779 | A1 | | 10/2001 | Malbrouck et al. | |
| 2013/0068005 | A1 | * | 3/2013 | David | ....................... F02K 9/96 73/116.03 |

FOREIGN PATENT DOCUMENTS

EP   1 134 568 A1   9/2001
GB   1 237 372 A    6/1971

OTHER PUBLICATIONS

Preliminary Search Report and Written Opinion on Patentability issued Nov. 14, 2014 in French Patent Application No. FR 1453025 (with English translation of Category of Cited Documents).

* cited by examiner

*Primary Examiner* — Todd M Epps
(74) *Attorney, Agent, or Firm* — Oblon, McClelland, Maier & Neustadt, L.L.P.

(57) ABSTRACT

The invention relates to a suspension device of at least one reactor module to a test bench comprising at least one suspension arm, at least one upstream fixing assembly adapted to be fixed to a ceiling or wall of the test bench, at least one downstream fixing assembly adapted to be fixed to a reactor module, said suspension arm extending between two attachment ends adapted to be respectively fixed to the upstream fixing assembly and to the downstream fixing assembly, characterized in that said arm has a flexible median area whereof at least one cross-section dimension is less than the same cross-section dimension at the level of the attachment ends, the downstream casing comprising a fall-protection device.

9 Claims, 10 Drawing Sheets

DEVICE FOR FIXING REACTOR MODULES TO A TEST BENCH

FIELD OF THE INVENTION

The present invention relates to fixing reactor modules to a test bench, and more particularly turboreactor, for aircraft.

PRIOR ART

Test benches by which different tests are conducted on the reactors (resistance of the reactor during separation of a turbine blade, for example) are used conventionally in the design, manufacture or maintenance phase of aircraft reactors, During tests, the module(s) to be tested are placed in the test bench. For this purpose they are suspended inside the latter by a suspension device which simulates fixing of the reactor to the aircraft, for example hooking under the wing of a plane. This suspension device must therefore reproduce a link of the same suppleness and same resistance as fixing between the reactor and the aircraft which it propels.

The new generations of reactor, and especially the new generations of turboreactors, are characterized by the increase of the weight/power ratio and their bulk relative to previous generations. This increase in power and bulk poses a problem as to the suspension of modules in the test benches, this suspension should have as the same time:
- the same suppleness as fixing of the reactor to the aircraft which it propels so that the tests are the most pertinent possible,
- sufficient resistance to mechanically maintain the different modules tested,
- sufficiently low bulk so that the assembly of the suspension device with all the modules of the reactor can be placed in to the test bench.

Figure 1:
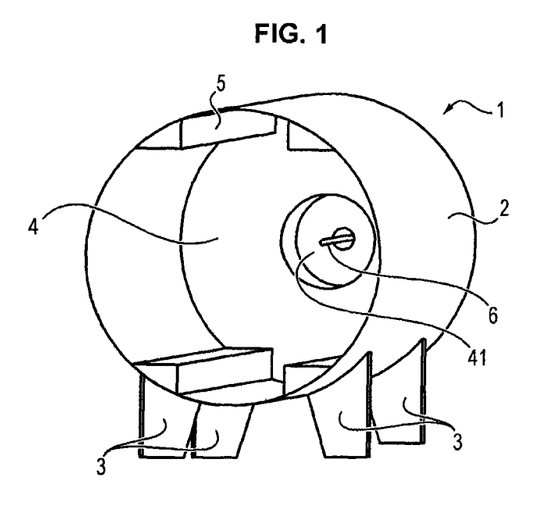
FIG. 1 illustrates a perspective view of a test bench in which the invention can be fixed.

Such a test bench conventionally comprises, as illustrated in FIG. 1, a cylindrical body 2 which is carried by support feet 3 and which integrates a wall 4 and a ceiling 5 on which are intended to be fixed suspension devices of the reactor modules to be tested. The fixing wall 4 substantially closes the cylindrical body 2 at one of its ends and in its centre has a circular opening 41 via which the different tools intended to test the reactor modules (engine shaft 6 intended to drive the engine according to a given speed (engine rating) are passed. The ceiling 5 extends to inside the body 2 perpendicularly to the wall 4 and in front of the latter.

Different types of suspension device are used according to whether the reactor is a low-mass reactor or a reactor having greater mass.

Figure 2:
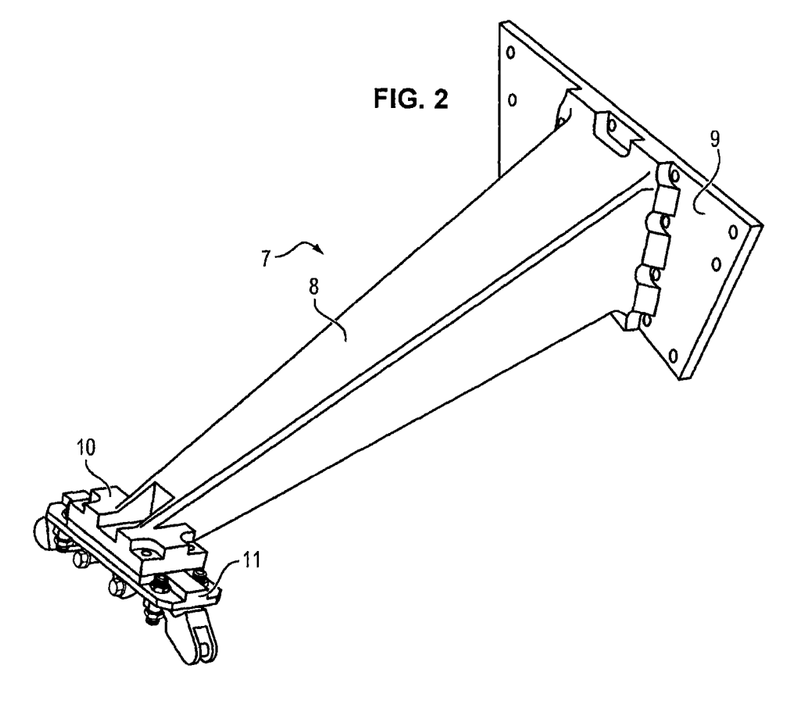
FIG. 2 illustrates a perspective view of a suspension device of a set of modules of a low-mass reactor which complies with the prior art.

FIG. 2 illustrates an example of a suspension device 7 for a low-mass reactor. This suspension device 7 comprises a suspension arm 8 which terminates at one and at the other of these ends by connecting flanges 9 and 10, one (flange 9) intended to be connected to the wall 4 of the test bench by means of screw nut type, the other (flange 10 at the other end of the arm) intended to bear the reactor module(s) by means of a suspension engine 11.

Such a structure is not however adapted in the case of larger masses or bulks.

Figure 3:
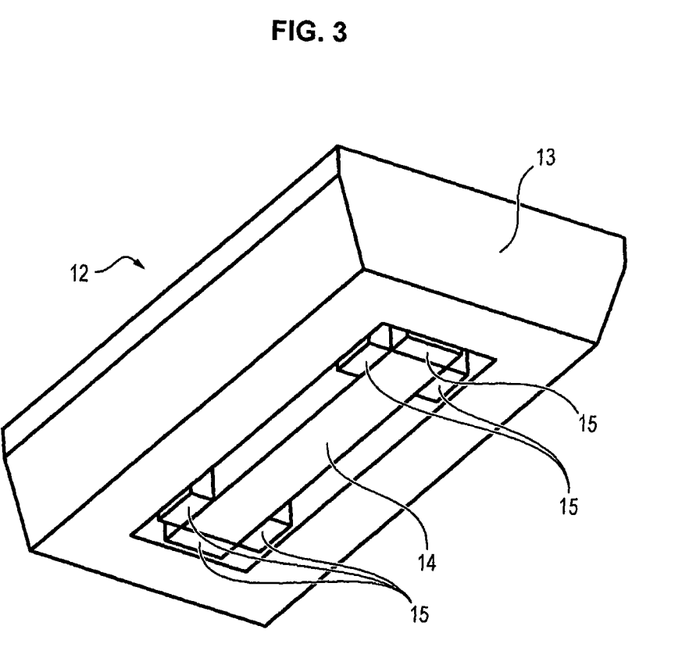
FIG. 3 illustrates a perspective view of the suspension device shown in FIG. 4.
Figure 4:
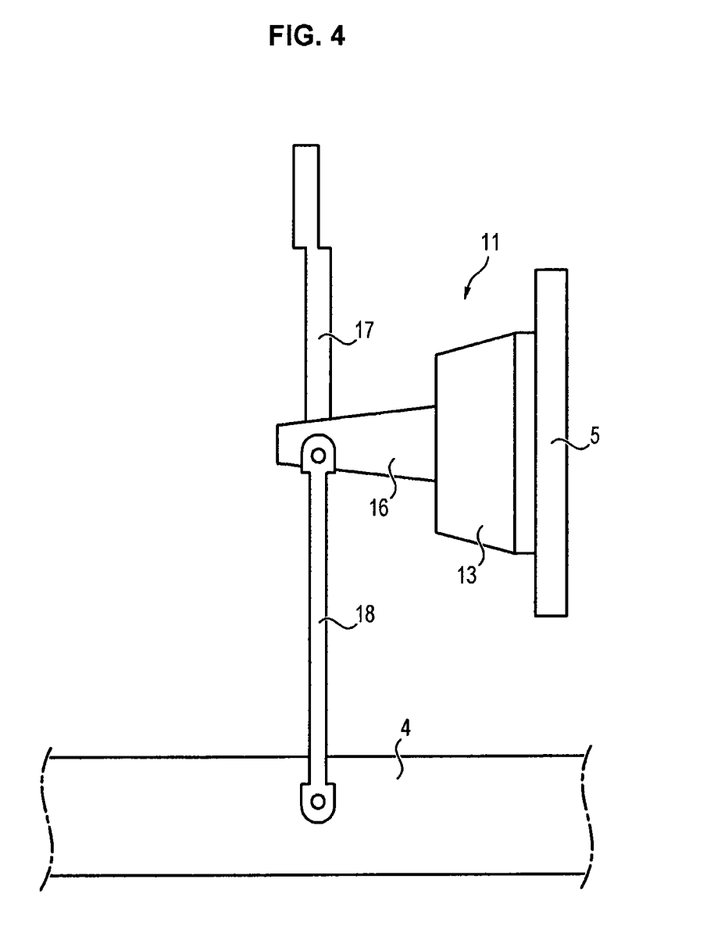
FIG. 4 illustrates a sectional view of a suspension device of a set of modules of a high-mass reactor which complies with the prior art and which is arranged in a test bench as per FIG. 1.

FIGS. 3 and 4 as such illustrate an example of a suspension device 12 already used in the case of reactor modules of greater mass. This device 12 comprises a fixing foot 13 which is intended to be fixed on the ceiling 5 of a test bench and on which a hooking mast 16 is attached. The foot 13 comprises for this purpose means 14 for anchoring the mast 16. Shock absorbers 15 made of elastomer are also provided here to reproduce the suppleness of fixing of the reactor modules.

A beam 17 also extends out from the mast 16, perpendicularly to the latter. The reactor modules to be tested are fixed on this beam 17.

FIG. 4 also illustrates a connecting rod 18 which connects the mast 16 to the wall 4, reproducing the suppleness of the fixing of a reactor to a plane.

The suspension device 12, such as illustrated in these FIGS. 3 and 4, is however too bulky to be used in the case of new-generation reactors.

Thus, suspension devices of a set of known modules of a reactor cannot provide the Resistance-suppleness-bulk compromise for simulating fixing a new-generation reactor to the device which it propels to conduct tests on all the modules of a new-generation reactor in a test bench.

GENERAL PRESENTATION OF THE INVENTION

The aim of the present invention is to improve the prior art by proposing a suspension device which best simulates the fixing of a set of modules of a reactor to the vehicle which it propels by ensuring the optimal resistance-suppleness-bulk compromise of the suspension device so tests can be conducted with a test bench on a set of modules of a reactor whereof the mass and the bulk are considerable.

The above aim is attained according to the invention by a suspension device of at least one reactor module to a test bench comprising at least one suspension arm, at least one upstream fixing assembly adapted for fixing to a ceiling or wall of the test bench, and at least one downstream fixing assembly adapted for fixing a reactor module, said suspension arm extending between two attachment ends adapted to be respectively fixed to the upstream fixing assembly and to the downstream fixing assembly, characterized in that said arm has a flexible median area whereof at least one cross-section dimension is less than the same cross-section dimension at the level of the attachment ends.

Here and throughout the present text section means the section according to a plane perpendicular to the main direction according to which the piece extends.

This characteristic adapts the section of the arms to the local mechanical constraints to which each of the parts of the arms is subjected, and therefore reduces the rigidity of the areas less stressed mechanically so that the overall structure has the preferred suppleness.

DESCRIPTION OF FIGURES

Other characteristics, aims and advantages of the present invention will emerge from the following detailed description, and with respect to the appended drawings given by way of non-limiting examples and in which.

DETAILED DESCRIPTION

Figure 5:
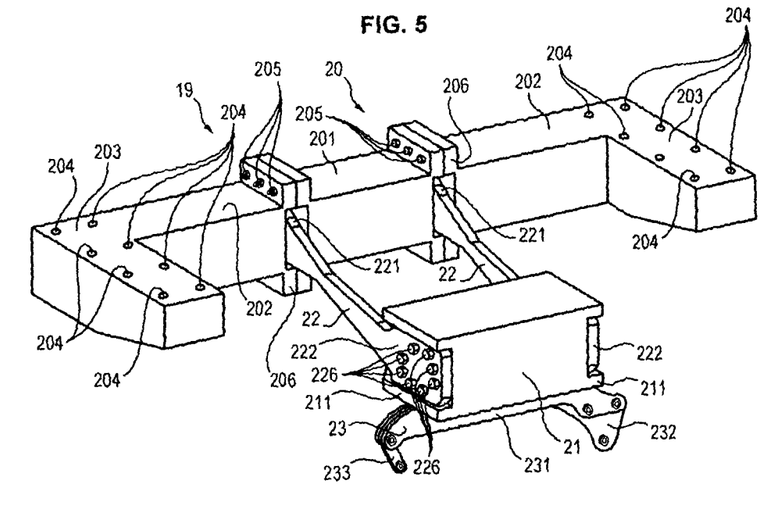
FIG. 5 illustrates a perspective view of a suspension device of a set of modules of a reactor according to a first embodiment of the invention.

The suspension device 19 shown in FIG. 5 comprises an upstream fixing assembly 20, a downstream fixing assembly 21, and two support arms 22 connecting said upstream fixing assembly 20 and said downstream fixing assembly 21.

The assembly 20 ensures fixing of the suspension device 19 on the ceiling 5 of the test bench 1. It comprises a central casing 201 and two lateral casings 202 attached on each side of the central casing 201 and fixed on the latter by screw-nut systems 205.

The two casings 202 are each in an L form, whereof one branch extends the central casing 201, while the other branch (away from said casing 201) is intended to allow fixing of said casings 202 (and consequently of the entire upstream structure 20) on the ceiling 5.

For this purpose, the upper surfaces 203 of these branches of the fixing casings 202 comprises bores 204 which allow fixing of said casings 202 on the ceiling 5 by bolting.

The downstream casing 21 has a general parallelepiped form and has the same length as the central casing 201.

It supports a device 23 intended to enable fixing of a reactor module. This fixing device 23 is composed of a principal body 231 on which are fixed a boomerang 232 and a connecting rod 233. The boomerang 232 is fixed to the main body 231 by forming a clamping link, and the connecting rod is fixed au main body 231 by forming a pivot link with an axis parallel to the engine shaft 6.

The two arm supports 22 are identical flat longerons terminating in attachment ends 221, 222. The ends 221 are fixed by bolting to one and the other of the two lateral faces of the central casing 201, while the two others ends 222 are fixed to the downstream casing 21 (bolting 226).

Figure 6:
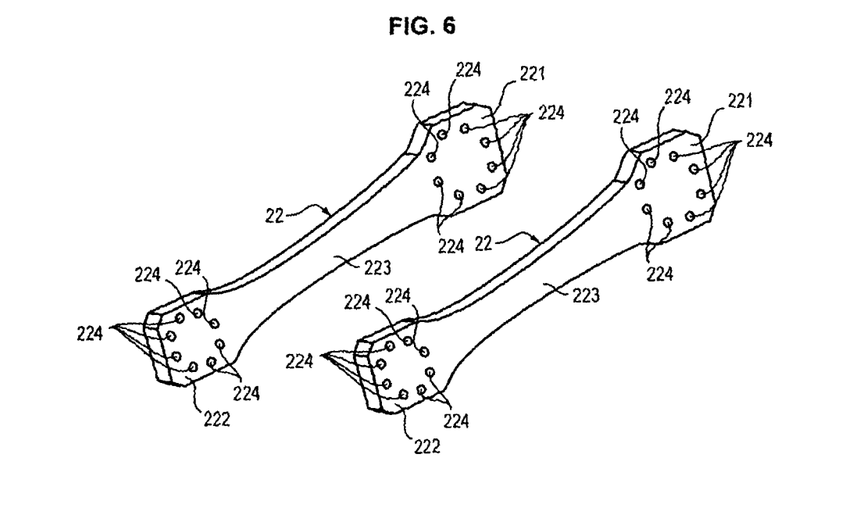
FIG. 6 illustrates a perspective view of two arms according to the first embodiment of the invention.

As illustrated in FIG. 6, the section of the arms 22 is not constant along the entire length of the arms 22. In particular, each of the arms 22 comprises a median area 223 whereof the section is less than the respective sections of the two attachment ends 221 and 222, at least one cross-section dimension being less than the same cross-section dimension at the level of the attachment ends 221, 222.

In the example shown, the arms 22 have a section of general rectangular form. They have a constant thickness over their entire length, the height of the arms 22 decreasing progressively from the attachment ends 221, 222 to the median area 223. The height of an arm 22 in its median area 223 is less than its height at the level of the attachment ends 221 and 222.

The smaller section areas 223 give the suspension device 19 its flexibility, while the end sections 221 and 222, clamped on the central casing 201 and the downstream casing 21 are adapted to the concentration of constraints which they support.

In this way, the suspension device 19 reproduces conditions of suppleness similar to those of fixing a reactor on an aircraft, and enabling relatively low bulk and good resistance to mechanical stresses. Such a device is consequently perfectly adapted to suspension of a new-generation reactor in a test bench of the type illustrated in FIG. 1.

Figure 7:
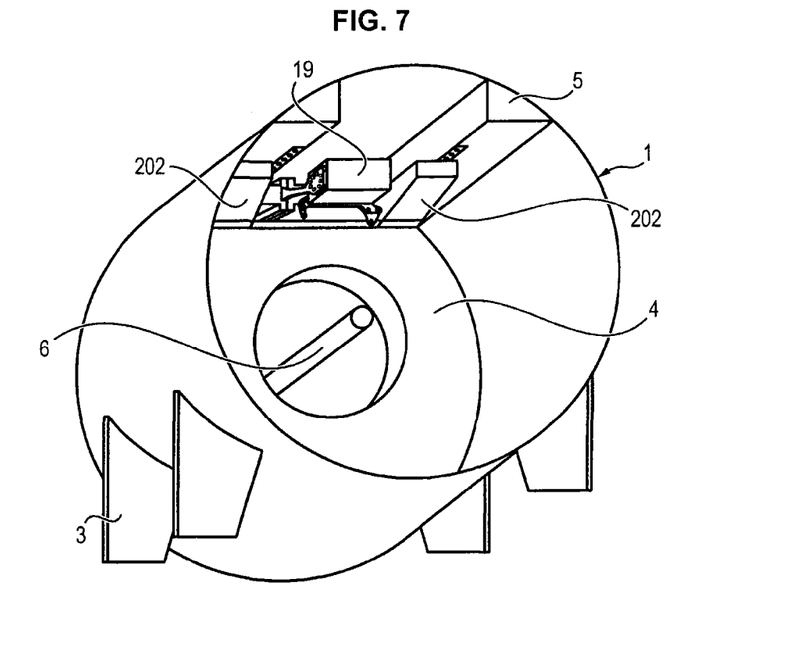
FIG. 7 illustrates a perspective view of the suspension device of a set of modules of a reactor according to the first embodiment installed in a test bench as in FIG. 1.
Figure 8:
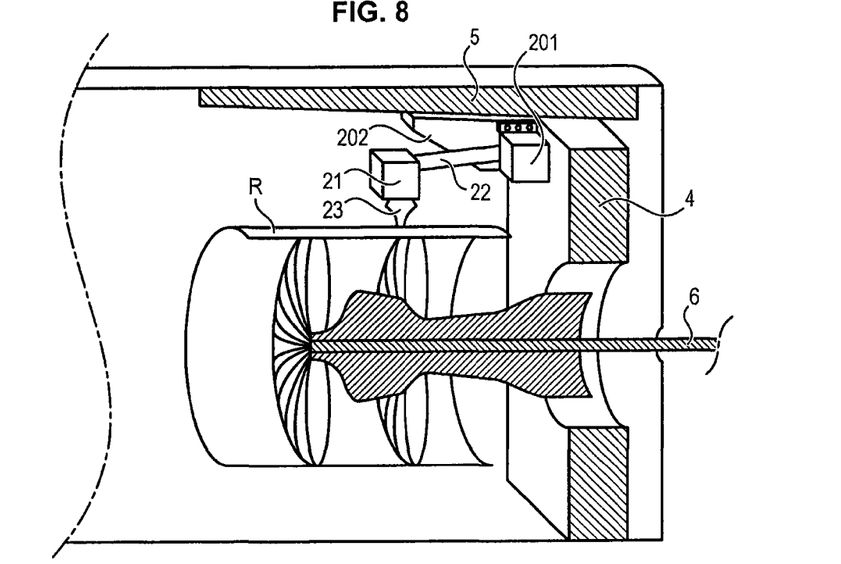
FIG. 8 illustrates a sectional view of an assembly of the suspension device of a set of modules of a reactor according to the first embodiment with a set of modules of a reactor fixed in a test bench as in FIG. 1.

A reactor module R to be tested is fixed on such a suspension device 19 by bolting on the fixing device 23 (FIGS. 7 and 8).

The fixing device 23 ensures an isostatic link with all the modules of a reactor. The suspension device 19 is such that the hub of all the modules of a reactor R is aligned with the engine shaft 6. Each pair of arms 22 is adapted as a function of the bulk of all the modules of the reactor R to adjust the height of the downstream casing 21 so that the set of modules of the reactor R is aligned with the engine shaft 6. Of course, to adapt the suspension device 19 to the bulk of all the modules of the reactor R, the length of the arms 22 can vary.

Figure 9A:
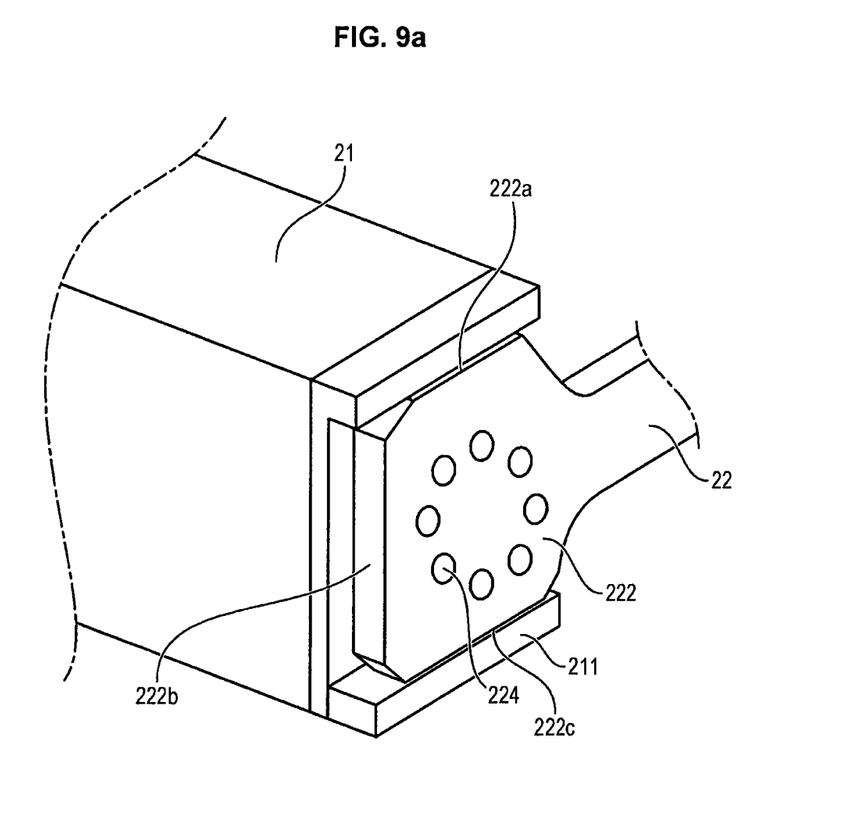
FIG. 9a illustrates a perspective view of an anti-peening device arranged on an upstream casing according to the first embodiment.
Figure 9B:
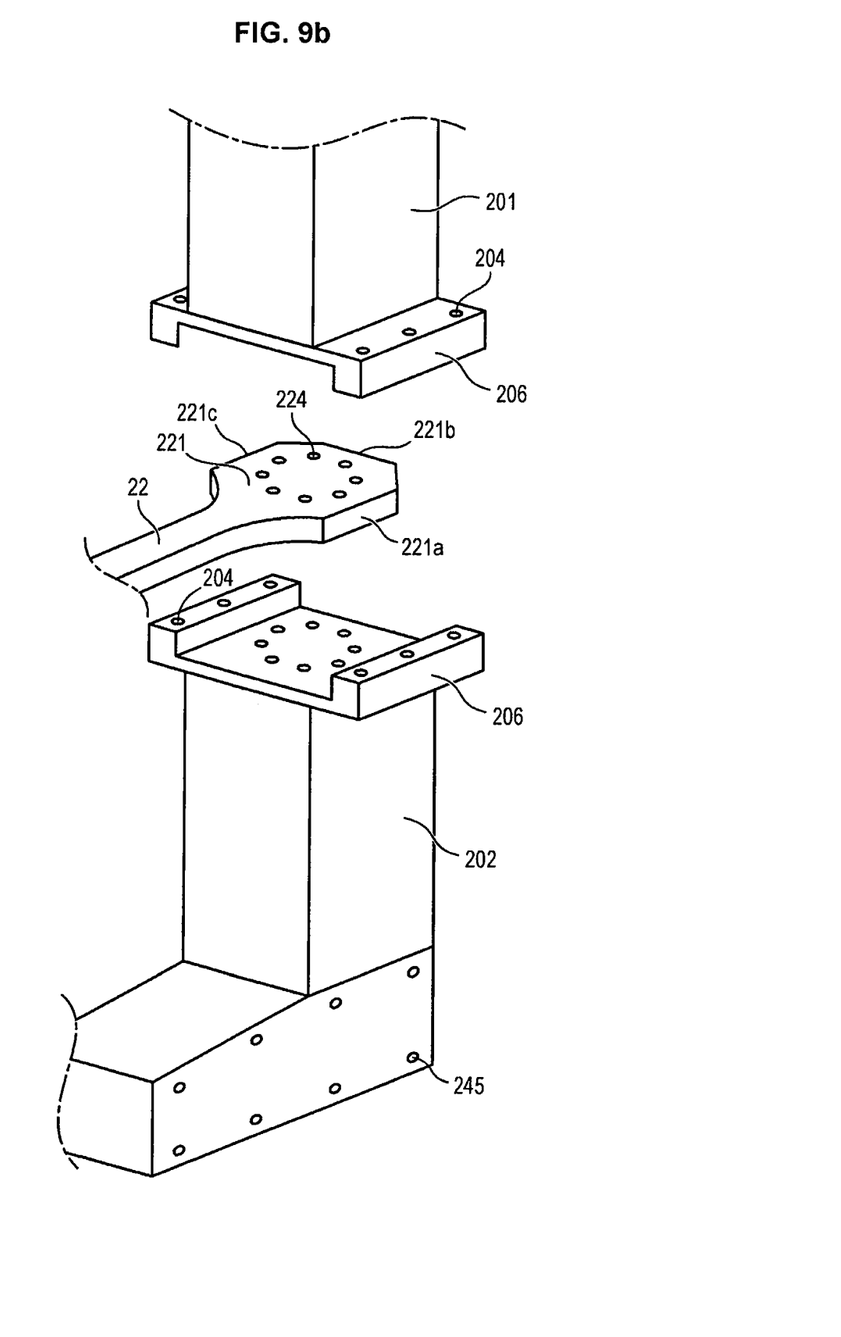
FIG. 9b illustrates an exploded perspective view of an anti-peening device formed by assembling a principal casing and a fixing casing according to the first embodiment.

Besides, as illustrated in FIGS. 9a and 9b, the upstream 20 and downstream 21 casings of the suspension device 19 comprise anti-peening devices 206 and 211. Two anti-peening devices 206 are arranged on the upstream casing 20, and two anti-peening devices 211 are arranged on the downstream casing 21.

The anti-peening devices 206 are constituted by the clamping assemblies which receive the ends 222, between the central casing 201 and the fixing casings 202. In particular, these devices 206 comprise, at the level of the two ends of the central casing 201 to which the casings 202 attach, a U-shaped reception piece comprising a fixing base and two rims preventing access to the attachment ends 222.

The anti-peening devices 211 are each constituted by a U-shaped reception piece with rims receiving the attachment ends 221.

The peening is limited by the complementarity of the form of the anti-peening devices 206, 211 with the form of the ends of the arms 22 which increases rigidity of the fixing of the arms 22 with the upstream casing 20 and the downstream casing 21.

The attachment ends 221, 222 are themselves rectangular chamfered shape, which also contributes to the anti-matting of the arms 22.

Other embodiments are of course possible.

Figure 10:
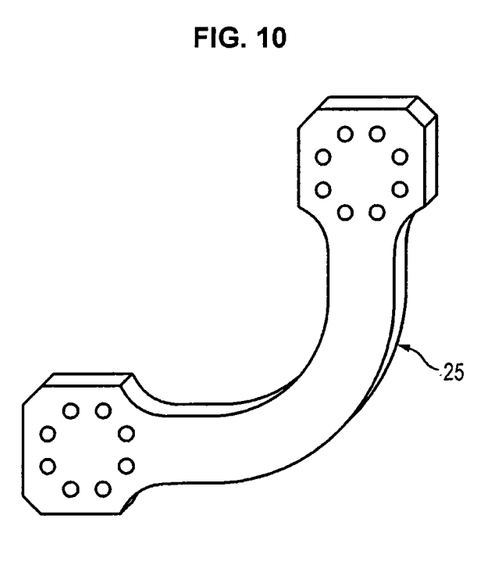
FIG. 10 illustrates an arm according to a second embodiment of the invention.

In particular, as illustrated in FIG. 10, the arms 22 can be replaced by bent arms 25, for example with an angle of 90°.

Because the arms 25 are bent this adapts the suspension device 19 for reactor module R assemblies of lesser bulk so as to align the set of the reactor modules R assemblies of lesser bulk with the engine shaft 6 of the test bench 1. Since the position of the engine shaft 6 is fixed, it is in fact necessary to vary the height at which all the modules of a reactor R are fixed as a function of the bulk of the set of the modules of the reactor R.

Modification of the angle of the elbow of the arms 25, and/or the length of the arms 25 adapts the suspension device 19 as a function of the bulk of the different assemblies of modules of the reactors R to be tested with the test bench 1.

Figure 11:
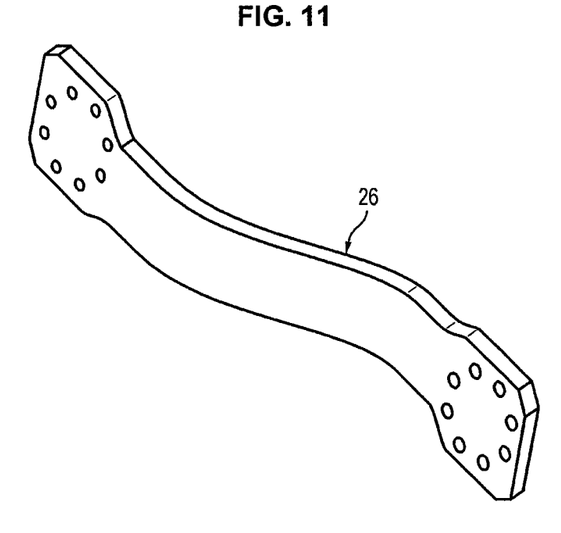
FIG. 11 illustrates an arm according to a third embodiment of the invention.

As another variant, such as illustrated in FIG. 11, the suspension device can comprise convergent or divergent arms 26. Because the arms 26 are divergent or convergent this modifies the suppleness of the suspension device. To adapt the upstream and downstream casings to the divergence or the convergence of the arms 26, the man skilled in the art will know that the size of the upstream and downstream casings must be different.

Figure 12A:
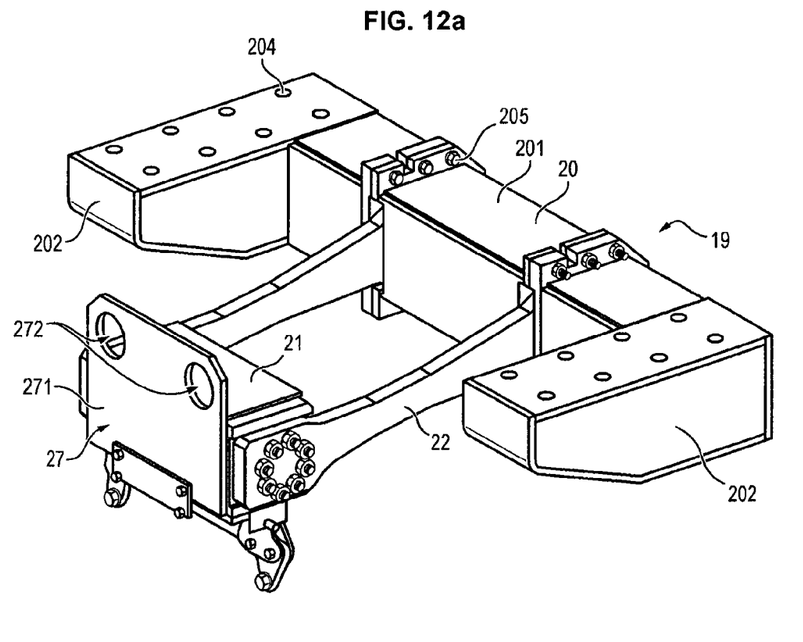
FIG. 12a illustrates a first perspective view of a suspension device of a set of modules of a reactor according to a fourth embodiment comprising a fall-protection device.
Figure 12B:
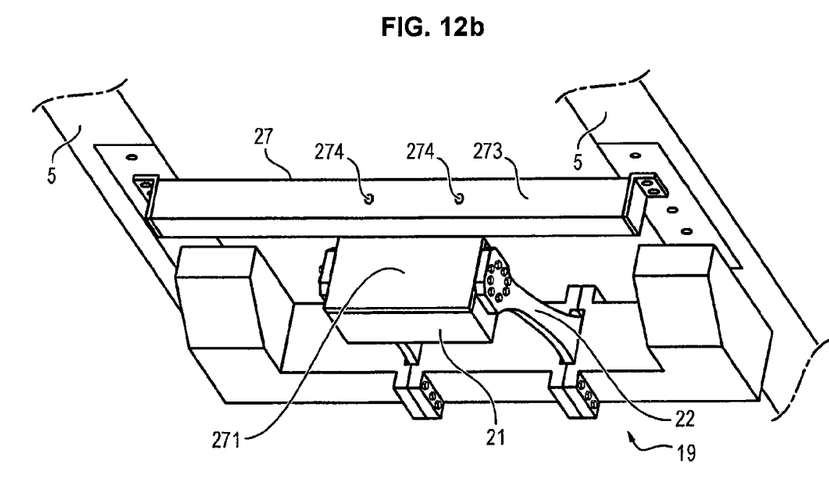
FIG. 12b illustrates a second perspective view of the suspension device of a set of modules of a reactor according to the fourth embodiment comprising a fall-protection device which is fixed on a test bench.
Figure 12C:
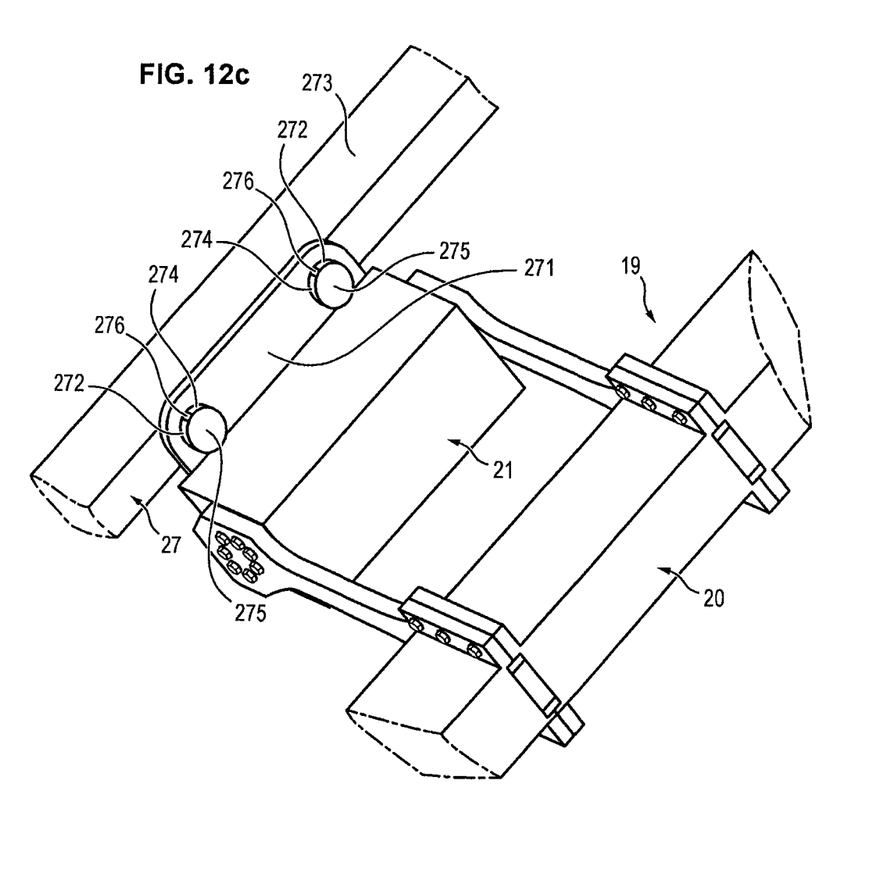
FIG. 12c illustrates a third perspective view of the suspension device of a set of modules of a reactor according to the fourth embodiment comprising a fall-protection device which is fixed on a test bench.

According to another embodiment shown in FIGS. 12*a*, 12*b* and 12*c*, the suspension device 19 of all modules of a reactor R comprises a fall-protection device 27. The fall-protection device 27 comprises:
 a perforated plate 271 fixed on the downstream casing 21 comprising two bores 272;
 a beam 273 fixed on the ceiling 5 of the test bench 1;
 two screws 274 fixed on the beam 273 which each comprise a head 275 and a body 276.

The two screws 274 are each arranged in a bore 272 such that the perforated plate 271 is arranged between the beam 273 and the heads 275 of the screws 274. In normal operation, these screws 274 are not in contact with the perforated plate 271, but they are capable of holding the perforated plate 271 by the heads 275 in case of collapse of the suspension device 19. This lets the fall-protection device 27 not modify the suppleness of the suspension device 19 and ensure the support of the suspension device 19 in case of rupture of the arms for example.

Figure 13:
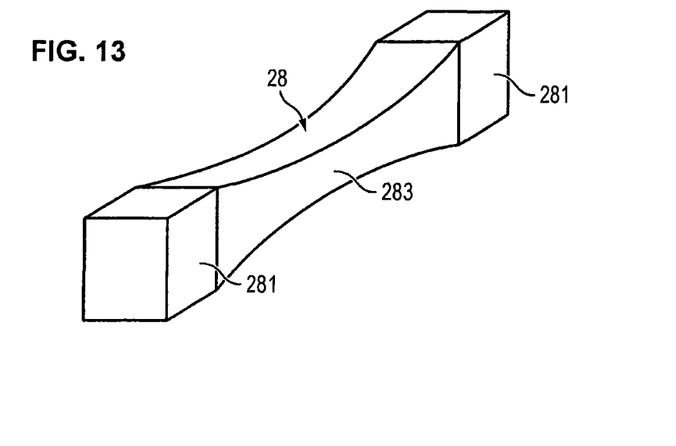
FIG. 13 illustrates an arm according to a fifth embodiment.

In another variant (FIG. 13), the suspension device 19 comprises a single arm 28 which comprises two ends 281, 282 and a median area 283 located between the two ends 281, 282. The section of the median area 283 is less than the section of the two ends 281 and 282. The evolution of the section of the arms 28 between the two ends 281, 282 and the median area 283 is obtained by variation of the height and/or of the width of the arms 28.

The invention claimed is:

1. A suspension device of at least one reactor module to a test bench comprising:
 at least one suspension arm,
 at least one upstream fixing assembly adapted to be fixed to a ceiling or wall of the test bench,
 at least one downstream fixing assembly adapted to be fixed to a reactor module, said at least one suspension arm extending between two attachment ends adapted to be respectively fixed to the at least one upstream fixing assembly and to the at least one downstream fixing assembly,
 wherein said at least one suspension arm has a flexible median area whereof at least one cross-section dimension is less than the same cross-section dimension at a level of the two attachment ends, said at least one suspension arm being a flat longeron whereof a height evolves progressively from the two attachment ends to the flexible median area.

2. The suspension device of at least one reactor module to a test bench according to claim 1, wherein said at least one suspension arm comprises two suspension arms extending between a piece of the at least one upstream fixing assembly and a piece of the at least one downstream fixing assembly, the two suspension arms together ensuring isostatic fixing.

3. The suspension device of at least one reactor module to a test bench according to claim 2, wherein the pieces of the at least one upstream fixing assembly and of the at least one downstream fixing assembly, on which the two suspension arms are fixed, are casings on lateral walls of which the two suspension arms are fixed by their attachment ends.

4. The suspension device of at least one reactor module to a test bench according to claim 3, wherein the at least one upstream fixing assembly comprises:
 a central casing on the lateral walls of which the two suspension arms are fixed by their attachment ends; and
 two fixing casings fixed to said central casing by being connected on either side of the central casing, at a level of its lateral walls.

5. The suspension device of at least one reactor module with a test bench according to claim 1, wherein the at least one upstream fixing assembly and the at least one downstream fixing assembly comprise at least one anti-peening device adapted to limit peening of a corresponding suspension arm of the at least one suspension arm.

6. The suspension device of at least one reactor module with a test bench according to claim 1, wherein the at least one downstream fixing assembly comprises a fall-protection device.

7. The suspension device of at least one reactor module with a test bench according to claim 1, wherein a suspension arm of the at least one suspension arm is bent.

8. The suspension device of at least one reactor module with a test bench according to claim 1, wherein a suspension arm of the at least one suspension arm is convergent or divergent.

9. The suspension device of at least one reactor module with a test bench according to claim 1, wherein the at least one upstream fixing assembly or the downstream fixing assembly comprises at least one anti-peening device adapted to limit peening of a corresponding suspension arm of the at least one suspension arm.

* * * * *